Nov. 20, 1951 H. A. WHEELER 2,575,571
WAVE-SIGNAL DIRECTIONAL COUPLER
Filed May 13, 1947
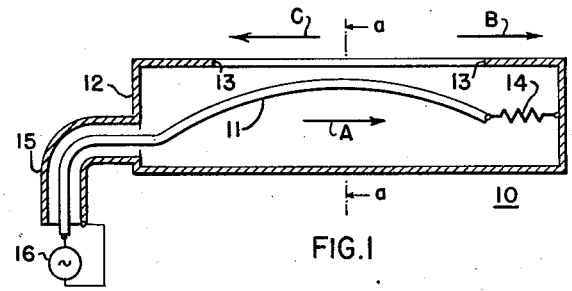
FIG.1
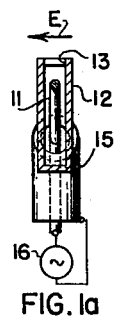
FIG. 1a
FIG.2
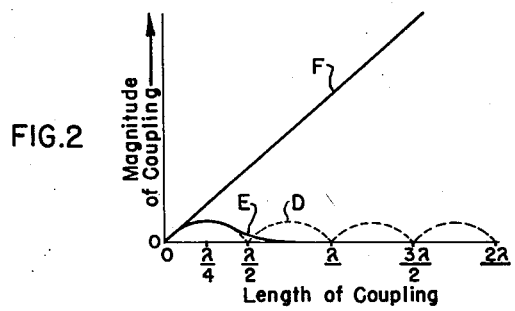
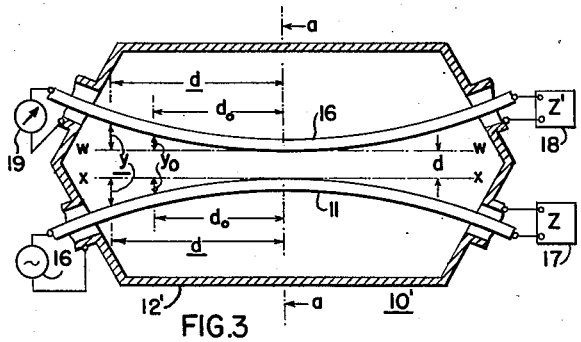
FIG.3
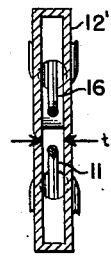
FIG.3a
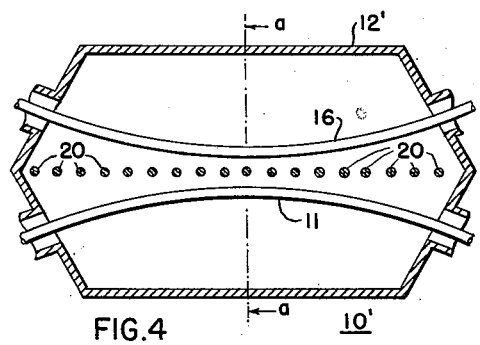
FIG.4
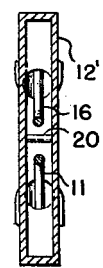
FIG.4a
INVENTOR.
HAROLD A. WHEELER
BY John A. Harvey
ATTORNEY Patented Nov. 20, 1951

2,575,571

UNITED STATES PATENT OFFICE 2,575,571

WAVE-SIGNAL DIRECTIONAL COUPLER

Harold A. Wheeler, Great Neck, N. Y., assignor to Hazeltine Research, Inc., Chicago, Ill., a corporation of Illinois Application May 13, 1947, Serial No. 747,822

12 Claims. (Cl. 178—44)

The present invention relates to wave-signal directional couplers and, particularly, to such couplers wherein a wave-signal translation path defined by a wave guide is directionally coupled with another wave-signal translation path contiguous to the wave guide. While the translating system of the present invention has utility in a wide range of applications, it has particular utility in wave-signal directional couplers of the type in which a wave being propagated in a certain direction in one path causes the propagation of a wave in a certain direction in an approximately parallel adjacent path.

It frequently is desirable to couple wave-signal energy from one wave-signal propagation path to a second such path, the direction of propagation in the second path being dependent on the direction of propagation in the first path. One of these wave propagation paths is bounded by a wave guide while the other may be a wave propagation path in space or may be bounded by a second wave guide. The term "wave guide" as used in the present specification and claims applies to a system of longitudinal conductive surfaces which act as the lateral boundaries of an electric wave and have the ability of directing the propagation of such wave. Wave guides may take the form of one or a pair of conductors in open space, or may comprise one conductor enclosed within but electrically insulated from a second conductor, as in the conventional coaxial transmission line, or may simply comprise a single tubular conductor having such transverse dimensions that it is capable of propagating an electric wave through the interior of the conductor.

Where two wave-signal propagation paths are directionally coupled as above mentioned, the directional coupler effecting this action may be of the "forwardly coupled" type or the "backwardly coupled" type. As used herein, a coupling in which a pure traveling wave in one direction in one wave propagation path causes a pure traveling wave in the same direction in the other wave propagation path is called "forward coupling" and the two paths are said to be "forwardly coupled." Similarly, a pure traveling wave coupled to flow in the second wave propagation path in a direction opposite that of a pure traveling wave in the first propagation path is called "backwardly coupled" and is caused by "back coupling."

One form of directional coupler heretofore proposed, of the forwardly coupled type, includes two juxtaposed hollow wave guides coupled at two or more points spaced longitudinally of the wave guides. The distance between each two successive coupling points is one-quarter wave length of the translated wave signal. The type of coupling between the wave guides is either predominantly inductive or predominantly capacitive, as desired. When the coupling points between two like wave guides have equal coupling and are spaced one-quarter wave length apart, wave signals coupled from one wave guide to the other have additive phase at all of the coupling points for travel of the wave signals in the forward direction whereas they have opposite phase in the backward direction so that the backwardly coupled energy cancels out. The use of only the minimum number of two coupling points causes this type of directive coupler to be highly frequency selective. That is, the ratio of magnitude of the forwardly coupled to the backwardly coupled energy is high only at that wave length which causes the coupling points to have an exact quarter-wave spacing, the ratio decreasing rapidly for wave-length values which cause the coupling points to have other values of wave-length spacing.

A directional coupler noncritical as to wave length, in which the ratio of coupling in a desired direction to an undersired direction remains consistently very large over a wide range of wave lengths, is disclosed and claimed in applicant's copending application Serial No. 670,081, filed May 16, 1946, entitled "Wave-Signal Translating System," and assigned to the same assignee as the present application. This coupler is of the backwardly coupled type and includes two juxtaposed wave guides, each of the coaxial transmission-line type, having a selected length of their inner conductors positioned substantially parallel and separated by a distance much less than the selected length and much less than the wave length of wave-signal energy translated through either of the guides. A coupling aperture is provided along the selected length of the inner conductors to provide inherently equal coefficients of capacitive and inductive coupling therebetween. Maximum coupling is provided by a selected length effectively equal to a quarter-wave length of the translated wave-signal energy.

In directional couplers of the type described, the change of boundaries incidental to the directional coupling of two wave-signal propagation paths over a selected length of coupling may cause a rather sudden change of the wave impedance of one or both paths at the ends of the selected length. This sudden impedance change in a propagation path produces reflection of wave-signal energy at the boundaries of the coupling region, consequently creating an undesirable operating condition for many applications.

It is an object of the present invention, therefore, to provide a new and improved directional coupler which avoids one or more of the disadvantages and limitations of prior such couplers.

It is a further object of the invention to provide a new and improved wave-signal directional coupler which exhibits substantially uniform or only gradually varying characteristic impedance and wave velocity along the length of one or more wave-signal propagation paths provided thereby, and one which therefore is characterized by minimum reflection of wave-signal energy from any point along the coupling region of the two intercoupled propagation paths.

It is an additional object of the invention to provide a new and improved wave-signal directional coupler having a relatively simple and inexpensive construction.

It is yet another object of the invention to provide a new and improved wave-signal directional coupler, of the forwardly coupled type, in which the magnitude of the desired directional coupling between two wave-signal propagation paths can be increased in proportion to the length of the coupling region without at the same time increasing the magnitude of the undesired coupling between the paths.

It is a further object of the invention to provide a new and improved wave-signal directional coupler which exhibits a broad-band characteristic; that is, one in which the ratio of the coupling in the desired direction to that in the undesired direction is maintained consistently very large over a wave-length band width which is at least a substantial fraction of the mean wave length.

In accordance with a particular form of the invention, a wave-signal directional coupler adapted to be positioned along a wave-signal propagation path for directional coupling therewith of signals having a wide band of wave lengths comprises a wave-guide structure providing a second wave-signal propagation path and including a conductor having a curved portion of a length at least equal to one-quarter wave-length of said band of wave lengths and arched with relation to the first path to provide between the paths along the length of the curved portion a coupling region over which the curved portion is approximately parallel to the first path, the portion having a maximum departure from geometrical linearity at the ends of the coupling region much less than the length of the coupling region, the paths being directionally coupled by at least one of the electric and magnetic fields of wave-signal energy propagated through one of the paths. The structure provides over the coupling region a value of coupling between the paths which gradually increases from at least one end of the coupling region to the center thereof.

For a better understanding of the present invention, together with other and further objects thereof, reference is had to the following description taken in connection with the accompanying drawing, and its scope will be pointed out in the appended claims.

Referring to the drawing, Fig. 1 represents schematically a wave-signal transmission system which includes a wave-signal directional coupler embodying the present invention in a particular form; Fig. 1a represents an end cross-sectional view along the plane a—a of Fig. 1; Fig. 2 graphically represents certain operating characteristics of a directional coupler embodying the Fig. 1 form of the invention and is used as an aid in explaining its operation; Figs. 3 and 3a are respectively elevational and end cross-sectional views of the wave-signal directional coupler embodying a modified form of the invention; and Figs. 4 and 4a are respectively elevational and end cross-sectional views of a wave-signal directional coupler embodying the present invention in an additionally modified form.

Referring now more particularly to Figs. 1 and 1a of the drawing, there is represented schematically a wave-signal translating system which includes a wave-signal directional coupler embodying the present invention in a particular form. This directional coupler is illustrated for use as a wave-signal antenna adapted to be positioned along a wave-signal propagation path in space for directional coupling therewith. The directional coupler comprises a wave-guide structure 10 providing a second wave-signal propagation path and including a conductor having a curved portion arched with relation to the space propagation path. In particular, as shown, the structure 10 includes a conductor 11 having a curved portion arched toward the space propagation path and providing between the paths along the length of its curved portion a coupling region over which the curved portion is approximately parallel to the space propagation path. The paths are directionally coupled by at least one of the electric and magnetic fields of wave-signal energy propagated through either propagation path. As will presently be more apparent, the coupling between the propagation paths gradually increases in value from the ends of the coupling region to the center thereof.

The wave-guide structure 10 includes a housing 12 of conductive material and of rectangular cross section which encloses the conductor 11 except for a coupling slot 13 provided along one edge of the housing 12 adjacent the arched portion of the conductor 11. The coupling slot 13 as shown inherently provides equal values of electric-field and magnetic-field coupling between the wave-signal propagation path of the wave-guide structure 10 and the space propagation path. If desired, however, the slot 13 may be closed by an electrostatic shield of the type hereinafter described in relation to a modified form of the invention to secure the advantages and changed characteristics effected thereby. The conductor 11 has a curvilinear portion, preferably of the shape of a circular arc or parabola, which provides a value of coupling varying longitudinally of the propagation paths approximately in accordance with the probability function. A maximum coupling between the paths is effected when the effective length of the open coupling slot 13 shown is approximately equal to one-quarter wave length of the wave-signal energy translated through the paths, the actual length being somewhat greater. Therefore the curved portion of the conductor 11 should have a length at least equal to one-quarter the mean wave length of the band of wave lengths over which the coupler is designed to be operable. As more clearly shown in Fig. 1a the housing 12 has parallel sides so spaced from the conductor 11 as to provide on opposite sides thereof electromagnetic-wave shield surfaces effective to maintain the characteristic impedance of the wave-signal propagation path of the structure 10 substantially uniform along its length. It will be understood that the conductor 11 is suitably supported in the housing 12 in insulated relation therewith by insulating spacers or the like, not shown. One end of the conductor 11 is connected to the housing 12 through a resistive impedance 14 having a value of impedance preferably equal to the characteristic impedance of the transmission line formed by the conductor 11 and the housing 12. The other end of the conductor 11 and the housing 12 are coupled through a coaxial type of transmission line 15, preferably of the same characteristic impedance, to a source 16 of wave-signal energy.

Considering now the operation of the wave-signal directional coupler just described, and referring to the curves of Fig. 2, wave-signal energy is supplied by the source 16 through the transmission line 15 to the wave-guide structure 10 and flows along the conductor 11 toward the terminating impedance 14. Assuming that any wave-signal energy which reaches the terminating impedance 14 is completely absorbed by the latter and that no reflection of wave-signal energy occurs at any point along the wave-signal propagation path provided by the conductor 11, a pure travel wave traverses the wave propagation path of the wave-guide structure 10 in the direction indicated by the arrow A.

As pointed out in applicant's aforementioned copending application, the coupling slot 13 causes the wave propagation path of the structure 10 and the space propagation path to have equal values of electric-field and magnetic-field coupling. This relation is inherently obtained by making the lateral dimensions of the open slot much less than the length thereof, the latter being much less than one-half wave length, and by making the width of the slot a small fraction of the lateral circumference of the housing 12. For this reason, a wave coupled to the space propagation path by the electric field and traveling in the forward direction indicated by the arrow B has equal amplitude and opposite phase relative to a wave forwardly coupled to the space propagation path by the magnetic field so that the magnitude of the forwardly coupled energy is zero for any length of the coupling aperture 13. Thus as regards forwardly coupled energy, the present structure and that of the copending application have a similar mode of operation. For energy coupled to the space path and traveling in the backward direction indicated by the arrow C, the mode of operation of the present directional coupler and that of the copending application likewise are similar with two exceptions. These exceptions arise from the use of the curved conductor 11 in the present coupler to provide a value of coupling varying gradually along the conductor 11, thereby to cause the magnitude of the backward coupling to vary with the effective length of the coupling slot 13 in wave lengths in the manner represented by the solid-line curve E. The magnitude of the backwardly coupled energy thus approaches zero gradually for values of slot length greater than one-quarter wave length, whereas in the specific examples shown in applicant's copending application the magnitude of the backwardly coupled energy varies with the length of the coupling aperture in the manner represented by the broken-line curve D. Both types of couplers consequently have maximum coupling in the backward direction C when the coupling aperture has an effective length equal to one-quarter wave length. The gradual variation of coupling along the slot 13 effected by a coupler embodying the present invention, and due to the use in the coupler of the curved conductor 11, also has the advantage of reducing end effects at the ends of the coupling region. These end effects are dissimilar for the electric and magnetic fields and otherwise tend to disturb the equality of the respective coefficients of coupling near the ends of the coupling slot.

It may be mentioned that the incremental values of coupling effected along the conductor 11 exactly cancel in the forward direction B and add in phase in the backward direction C only when the wave-signal phase velocity in the propagation path of the wave-guide structure 10 is the same as that in the space propagation path. Hence, the wave-guide structure 10 should preferably employ air dielectric over the length of the arched portion of the conductor 11. It may further be mentioned that while the curves of Fig. 2 are plotted with reference to varying values of slot length for a given fixed wave length of translated wave energy, the curves show equally well the variation of coupling for a slot of fixed length but with inversely varying values of the wave length of translated wave energy.

Wave-signal energy coupled to the space propagation path travels therethrough as radiated energy so that the directional coupler of the Fig. 1 arrangement operates as a directive antenna having a maximum response in the backward direction C but substantially no response in the forward direction B. While the directional coupler has been shown and described as utilized in a wave-signal transmission system, however, it will be apparent that it has equal utility as a wave-signal receiving antenna simply by replacing the wave-signal source 16 by a wave-signal receiving apparatus. When so used, it has a directional response characteristic having maximum response to a wave traveling past the directional coupler from the backward direction B and a minimum response to a wave traveling from the direction C.

Figs. 3 and 3a illustrate a wave-signal directional coupler embodying a modified form of the invention essentially similar to that of Fig. 1, similar elements being designated by similar reference numerals and analogous elements by similar reference numerals primed, except that the housing 12' encloses also a second curvilinear conductor 16 which forms with the housing another transmission line providing a second wave-signal propagation path in addition to that provided by the conductor 11 and housing 12'. While the conductor 16 may be straight to provide a straight propagation path similar to the space propagation path of the Fig. 1 arrangement, the conductor 16 is preferably curved with the same shape as the conductor 11. For purposes of illustrating the utility of a wave-signal directional coupler embodying the present modified form of the invention, the directional coupler is shown as used in a system for measuring the value of wave-signal energy supplied from a wave-signal source 16 to a wave-signal load device 17 which may be an antenna. This device has an impedance Z which preferably is approximately equal to the characteristic impedance of the line 11, 12'. To ensure that the measurement shall be unresponsive to reflected energy caused by a nominal mismatch in this termination, the forward end of the conductor 16 is terminated by an impedance 18 of value Z' matching the characteristic impedance of the transmission line provided by the conductor 16 and housing 12'. The opposite end of the conductor 16 is coupled to the housing 12' through a suitable meter 19 in conventional manner to measure the magnitude of the wave-signal energy flowing in the backward direction along the conductor 16. As thus arranged, wave-signal energy traveling in a forward direction along the conductor 11 from the source 15 to the load device 17 couples wave-signal energy into the wave propagation path provided by the conductors 16 and housing 12'. This energy flows in the latter path in the backward direction toward the meter 19 which is effective to measure its value. Any wave-signal energy which is reflected by the load device 17 travels in the opposite direction along the conductor 11 and couples into the second wave propagation path wave-signal energy which travels along the conductor 16 towards the terminating impedance 18 where it is absorbed. The arrangement thus measures only the energy supplied from the source 15 to the load device 17, and not the energy reflected back.

In a wave-signal directional coupler embodying the Fig. 3 modified form of the invention, the curved conductors 11 and 16 preferably have a curvature such as to provide a value of coupling which varies along the conductors in accordance with the probability function. The mathematical equations defining the curvature of the conductors 11 and 16 to provide this mode of coupling will now be derived under the assumption that the rate of curvature of the conductors is rather small so that they are nearly parallel. This assumption is approximately realized in practice. The maximum value of the coefficient of coupling between the first and second wave propagation paths occurs, of course, in the region of the conductors 11 and 16 where they are most closely spaced and has a value which is less than unity and varying with their separation $d$.

Now if the conductors 11 and 16 were parallel as indicated by the broken lines X—X and W—W, the coefficient of coupling at any point along their lengths would be equal to that at any other point. Due to their curvature, however, their coefficient of coupling at any point spaced a distance $d$ from the center thereof is less than the value at the center in a ratio determined by the departure $y$ of each conductor from the parallel relation mentioned. It is known that, for any selected value $t$ (Fig. 3a) of the spacing of the sides of the housing 12', the ratio $r$ of coupling at any point along the conductors 11, 16 to the value of coupling at the centers thereof is given by the relation:

$$r = \exp. - \frac{\pi y}{t} \qquad (1)$$

If $d_o$ represents the distance from the center of the conductors at which the ratio $r$ of coupling last mentioned is equal to one napier $(1/e)$, the corresponding spacing $y_o$ of either conductor from the axes W—W or X—X is thus seen from Equation 1 to have the value:

$$y_o = \frac{t}{\pi} \qquad (2)$$

Since the coefficient of coupling along the conductors 11 and 16 is to vary in accordance with the probability function, the ratio $r$ of coupling at any distance $d$ to the value of coupling at the center preferably should vary in the relation:

$$r = \exp. - \left(\frac{d}{d_o}\right)^2 \qquad (3)$$

Equations 1 and 3 are satisfied by the following relation:

$$\frac{\pi y}{t} = \left(\frac{d}{d_o}\right)^2 \qquad (4)$$

The corresponding departure $y$ of either conductor from the parallel relationship is:

$$y = \frac{t}{\pi}\left(\frac{d}{d_o}\right)^2 \qquad (5)$$

The ratio of the departure $y$ at any point along the conductors to their value of departure $y_o$, at which their coupling is reduced by one napier, is seen from Equations 2 and 5 to have the value:

$$\frac{y}{y_o} = \left(\frac{d}{d_o}\right)^2 \qquad (6)$$

Equation 6 defines a parabola. Therefore the conductors 11 and 16 will have a variation of coupling along their lengths in accordance with the probability function if the conductors have a parabolic shape as shown. In practice, if the conductors have a contour corresponding approximately to the arc of a circle whose radius is much greater than their separation, the variation of coupling between the conductors will approximate the ideal closely enough for most applications.

As in the directional coupler arrangement of Fig. 1, the maximum value of coupling between the wave propagation paths of the wave-guide structure 10' is effected by making the effective length of the coupling region between the conductors 11 and 16 approximately equal to one-quarter wave length.

Figs. 4 and 4a illustrate a wave-signal directional coupler embodying a modified form of the invention essentially similar to that of Figs. 3 and 3a, similar elements being designated by similar reference numerals. The wave-guide structure 10' of this arrangement, however, includes a plurality of members distributed over the coupling region between the conductors 11 and 16 unequally to effect the coupling between the wave propagation paths of the structure 10' by the respective electric and magnetic fields of wave-signal energy propagated along the paths. As an example, the housing 12' includes an electrostatic shield in the coupling region between the paths to reduce the electric-field coupling between the paths so the remaining coupling is predominantly effected by the magnetic fields of the propagated wave-signal energy. This electrostatic shield comprises a plurality of closely spaced wires or rods 20 of conductive material electrically and mechanically connected to one or both sides of the housing 12' and preferably lying in a plane equidistant between and symmetrical with relation to the conductors 11 and 16.

As explained in applicant's copending application Serial No. 747,821, now abandoned, entitled "Wave-Signal Translating System," and assigned to the same assignee as the present application, the electrostatic shield provided by the members 20 causes the forward direction of coupling to have a value proportional to the length of the coupling region between the conductors 11 and 16 as represented by curve F in Fig. 2. The value of the backwardly coupled wave-signal energy is represented by solid-line curve E since the conductors are curvilinear as hereinbefore described to provide a coefficient of coupling along the coupling region varying approximately in accordance with the probability function.

For reasons explained in applicant's last-mentioned copending application, it is preferable in this form of the invention to provide a coupling region between the conductors 11 and 16 having an effective length as long as possible, say several wave lengths. This ensures that the forwardly coupled wave-signal energy has a magnitude much greater than that of the backwardly coupled energy. For coupling between the conductors 11 and 16 varying in accordance with the probability function, the backward coupling represented by curve E of Fig. 2 is less for greater lengths, so the ratio of the forwardly coupled energy to the backwardly coupled energy is very large for any effective length of the coupling region greater than one-half wave length. If the coupling region is several wave lengths long, the directional coupler operates effectively over a large ratio of wave lengths with a directional ratio much larger than that heretofore obtained in practice. The fact that the coupling between the wave propagation paths of the directional coupler 10' gradually increases in value from the ends of the coupling region to the center thereof ensures freedom from reflection of any substantial amount of wave-signal energy from any point in the wave propagation paths of the directional coupler even though the magnitude of coupling between the paths is very large.

It will be apparent from the above description of the invention that a wave-signal directional coupler embodying the invention involves a simple and inexpensive construction. It also has the advantage that it operates over a large ratio of wave lengths with a large ratio of the coupling in the desired direction to that in the undesired direction. One form of wave-signal directional coupler in accordance with the present invention has the further advantage that a larger magnitude of the desired coupling may be attained between two wave-signal translation paths, at least one of which is provided by the coupler, without at the same time increasing the magnitude of the residual undesired coupling between the paths, in fact, actually decreasing the latter to a relative amount substantially less than that obtained in prior directional couplers.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave-signal directional coupler, adapted to be positioned along a wave-signal propagation path for directional coupling therewith of signals having a wide band of wave lengths, comprising: a wave-guide structure providing a second wave-signal propagation path and including a conductor having a curved portion of a length at least equal to one-quarter the mean wave length of said band of wave lengths and arched with relation to said first path to provide between said paths along the length of said portion a coupling region over which said curved portion is approximately parallel to said first path, said portion having a maximum departure from geometrical linearity at the ends of said coupling region much less than the length of said coupling region, said paths being directionally coupled by at least one of the electric and magnetic fields of wave-signal energy propagated through said paths, said structure providing over said coupling region a value of coupling between said paths which gradually increases from at least one end of said coupling region to the center thereof.

2. A wave-signal directional coupler, adapted to be positioned along a wave-signal propagation path for directional coupling therewith of signals having a wide band of wave lengths, comprising: a wave-guide structure providing a second wave-signal propagation path and including a conductor having a smoothly curved portion of a length at least equal to one-quarter the mean wave length of said band of wave lengths and arched with relation to said first path to provide between said paths along the length of said portion a coupling region over which said curved portion is approximately parallel to said first path, said portion having a maximum departure from geometrical linearity at the ends of said coupling region much less than the length of said coupling region, said paths being directionally coupled by at least one of the electric and magnetic fields of wave-signal energy propagated through said paths, said structure providing over said coupling region a value of coupling between said paths which gradually increases from at least one end of said coupling region to the center thereof.

3. A wave-signal directional coupler, adapted to be positioned along a wave-signal propagation path for directional coupling therewith of signals having a wide band of wave lengths, comprising: a wave-guide structure providing a second wave-signal propagation path and including a conductor having a curved portion of a length at least equal to one-quarter the mean wave length of said band of wave lengths and arched with relation to said first path to provide between said paths along the length of said portion a coupling region over which said curved portion is approximately parallel to said first path, said portion having a maximum departure from geometrical linearity at the ends of said coupling region much less than the length of said coupling region, said paths being directionally coupled by at least one of the electric and magnetic fields of wave-signal energy propagated through said paths, said portion of said conductor having a curvature selected to provide between said paths a value of coupling which varies longitudinally thereof approximately in accordance with a probability function, whereby the coupling between said paths gradually increases in value from at least one end of said coupling region to the center thereof.

4. A wave-signal directional coupler, adapted to be positioned along a wave-signal propagation path for directional coupling therewith of signals having a wide band of wave lengths, comprising: a wave-guide structure providing a second wave-signal propagation path and including a conductor having a curved portion of a length at least equal to one-quarter the mean wave length of said band of wave lengths and arched with relation to said first path to provide between said paths along the length of said portion a coupling region over which said curved portion is approximately parallel to said first path, said portion having a maximum departure from geometrical linearity at the ends of said coupling region much less than the length of said coupling region, said paths being directionally coupled by at least one of the electric and magnetic fields of wave-signal energy propagated through said paths, said structure providing a length of said coupling region not substantially less than one-quarter wave length over which the coupling between said paths gradually increases in value from at least one end of said coupling region to the center thereof.

5. A wave-signal directional coupler, adapted to be positioned along a wave-signal propagation path for directional coupling therewith of signals having a wide band of wave lengths, comprising: a wave-guide structure providing a second wave-signal propagation path and including a conductor having a curved portion of a length at least equal to one-quarter the mean wave length of said band of wave lengths and arched with relation to said first path to provide between said paths along the length of said portion a coupling region over which said curved portion is approximately parallel to said first path, said portion having a maximum departure from geometrical linearity at the ends of said coupling region much less than the length of said coupling region, said paths being directionally coupled by equal values of the electric and magnetic fields of wave-signal energy propagated through said paths, said structure providing over said coupling region a value of coupling between said paths which gradually increases from at least one end of said coupling region to the center thereof.

6. A wave-signal directional coupler, adapted to be positioned along a wave-signal propagation path for directional coupling therewith of signals having a wide band of wave lengths, comprising: a wave-guide structure providing a second wave-signal propagation path and including a conductor having a curved portion of a length at least equal to one-quarter the mean wave length of said band of wave lengths and arched with relation to said first path to provide between said paths along the length of said portion a coupling region over which said curved portion is approximately parallel to said first path, said portion having a maximum departure from geometrical linearity at the ends of said coupling region much less than the length of said coupling region, said paths being directionally coupled by equal values of the electric and magnetic fields of wave-signal energy propagated through said paths, said structure providing a length of said coupling region longitudinally of said paths approximately equal to one-quarter wave length over which the coupling between said paths gradually increases in value from at least one end of said coupling region to the center thereof.

7. A wave-signal directional coupler, adapted to be positioned along a wave-signal propagation path for directional coupling therewith of signals having a wide band of wave lengths, comprising: a wave-guide structure providing a second wave-signal propagation path and including a conductor having a curved portion of a length at least equal to one-quarter the mean wave length of said band of wave lengths and arched with relation to said first path to provide between said paths along the length of said portion a coupling region over which said curved portion is approximately parallel to said first path, said portion having a maximum departure from geometrical linearity at the ends of said coupling region much less than the length of said coupling region, said structure including a plurality of members distributed over said coupling region to provide coupling between said paths predominantly effected by one of the electric and magnetic fields of wave-signal energy propagated through said paths and providing a value of coupling between said paths which gradually increases from at least one end of said coupling region to the center thereof.

8. A wave-signal directional coupler, adapted to be positioned along a wave-signal propagation path for directional coupling therewith of signals having a wide band of wave lengths, comprising: a wave-guide structure providing a second wave-signal propagation path and including a conductor having a curved portion of a length at least equal to one-quarter the mean wave length of said band of wave lengths and arched with relation to said first path to provide between said paths along the length of said portion a coupling region over which said curved portion is approximately parallel to said first path, said portion having a maximum departure from geometrical linearity at the ends of said coupling region much less than the length of said coupling region, said structure including an electrostatic shield over said region and between said paths to provide between said paths coupling predominantly effected by the magnetic field of wave-signal energy propagated through said paths and providing a value of coupling between said paths which gradually increases from at least one end of said coupling region to the center thereof.

9. A wave-signal directional coupler, adapted to be positioned along a wave-signal propagation path for directional coupling therewith of signals having a wide band of wave lengths, comprising: a wave-guide structure providing a second wave-signal propagation path and including a conductor having a curved portion of a length at least equal to the mean wave length of said band of wave lengths and arched with relation to said first path to provide between said paths along the length of said portion a coupling region over which said curved portion is approximately parallel to said first path, said portion having a maximum departure from geometrical linearity at the ends of said coupling region much less than the length of said coupling region, said structure including a plurality of members distributed over said coupling region to provide coupling between said paths predominantly effected by one of the electric and magnetic fields of wave-signal energy propagated through said paths, said coupling region having a length longitudinally of said paths not substantially less than one wave length of said translated wave-signal energy and providing a value of coupling between said paths which gradually increases from at least one end of said coupling region to the center thereof.

10. A wave-signal directional coupler, comprising: a pair of wave guides providing individual wave-signal propagation paths for signals having a wide band of wave lengths and including individual approximately parallel conductors having a selected length thereof exposed to one another to provide between said paths a coupling region over which at least one of the conductors has a curved portion of a length at least equal to one-quarter the mean wave length of said band of wave lengths and arched with relation to the other of said conductors, said portion having a maximum departure from geometrical linearity at the ends of said coupling region much less than the length of said coupling region, said paths being directionally coupled by at least one of the electric and magnetic fields of wave-signal energy propagated through said paths, said structure providing a value of coupling between said paths which gradually increases from at least one end of said coupling region to the center thereof.

11. A wave-signal directional coupler, comprising: a pair of wave guides providing individual wave-signal propagation paths for signals having a wide band of wave lengths and including individual approximately parallel conductors having a selected length thereof exposed to one another to provide between said paths a coupling region over which each of said conductors has a similar curved portion of a length at least equal to one-quarter the mean wave length of said band of wave lengths and arched with relation to the curved portion of the other of said conductors, said portions having maximum departures from geometrical linearity at the ends of said coupling region much less than the length of said coupling region said paths being directionally coupled by at least one of the electric and magnetic fields of wave-signal energy propagated through said paths, said structure providing a value of coupling between said paths which gradually increases from at least one end of said coupling region to the center thereof.

12. A wave-signal directional coupler, comprising: a pair of wave guides providing individual wave-signal propagation paths for signals having a wide band of wave lengths and including individual approximately parallel conductors having a selected length thereof exposed to one another to provide between said paths a coupling region over which each of said conductors has a similar curved portion of a length at least equal to one-quarter the mean wave length of said band of wave lengths and arched with relation to the curved portion of the other of said conductors, said portions having maximum departures from geometrical linearity at the ends of said coupling region much less than the length of said coupling region said paths being directionally coupled by at least one of the electric and magnetic fields of wave-signal energy propagated through said paths, said structure including conductive and substantially planar electromagnetic shield members positioned on opposite sides of said conductor portions approximately parallel to the median plane thereof to maintain substantially uniform the characteristic impedance of said conductor portions along the length of each thereof and said coupling region providing a value of coupling between said paths which gradually increases from at least one end of said coupling region to the center thereof.

HAROLD A. WHEELER.

REFERENCES CITED

The following references are of record in the file of this patent:

UNITED STATES PATENTS

| Number | Name | Date |
|---|---|---|
| 2,086,615 | Grundmann | July 13, 1937 |
| 2,199,221 | Gilman | Apr. 30, 1940 |
| 2,433,368 | Johnson | Dec. 30, 1947 |
| 2,434,334 | Sheppard | Jan. 13, 1948 |
| 2,486,818 | Bowman | Nov. 1, 1949 |